INVENTOR.
SHIH CHIEH CHAO
BY John B. Sponsler
AGENT

INVENTOR.
SHIH CHIEH CHAO
BY
John B. Sponsler
AGENT

March 27, 1962 SHIH CHIEH CHAO 3,027,082

APPARATUS FOR ADDING AND MULTIPLYING

Filed Feb. 16, 1954 5 Sheets-Sheet 3

INVENTOR.
SHIH CHIEH CHAO
BY
John B. Sponsler
AGENT

INVENTOR.
SHIH CHIEH CHAO
BY
John B. Aponsler
AGENT

March 27, 1962 SHIH CHIEH CHAO 3,027,082

APPARATUS FOR ADDING AND MULTIPLYING

Filed Feb. 16, 1954 5 Sheets-Sheet 5

INVENTOR.
SHIH CHIEH CHAO
BY
John B. Aponsler
AGENT

United States Patent Office 3,027,082

Patented Mar. 27, 1962

3,027,082

APPARATUS FOR ADDING AND MULTIPLYING

Shih Chieh Chao, San Jose, Calif., assignor to International Business Machines Corporation, New York, N.Y., a corporation of New York Filed Feb. 16, 1954, Ser. No. 410,539
17 Claims. (Cl. 235—164)

The present invention appertains generally to adders and multipliers, and relates more particularly to adders and multipliers utilizing the analog technique.

It is an object of this invention to provide an improved adder-multiplier.

Another object is to provide a simplified and inexpensive adder-multiplier having a high degree of reliability.

Figure 1A:
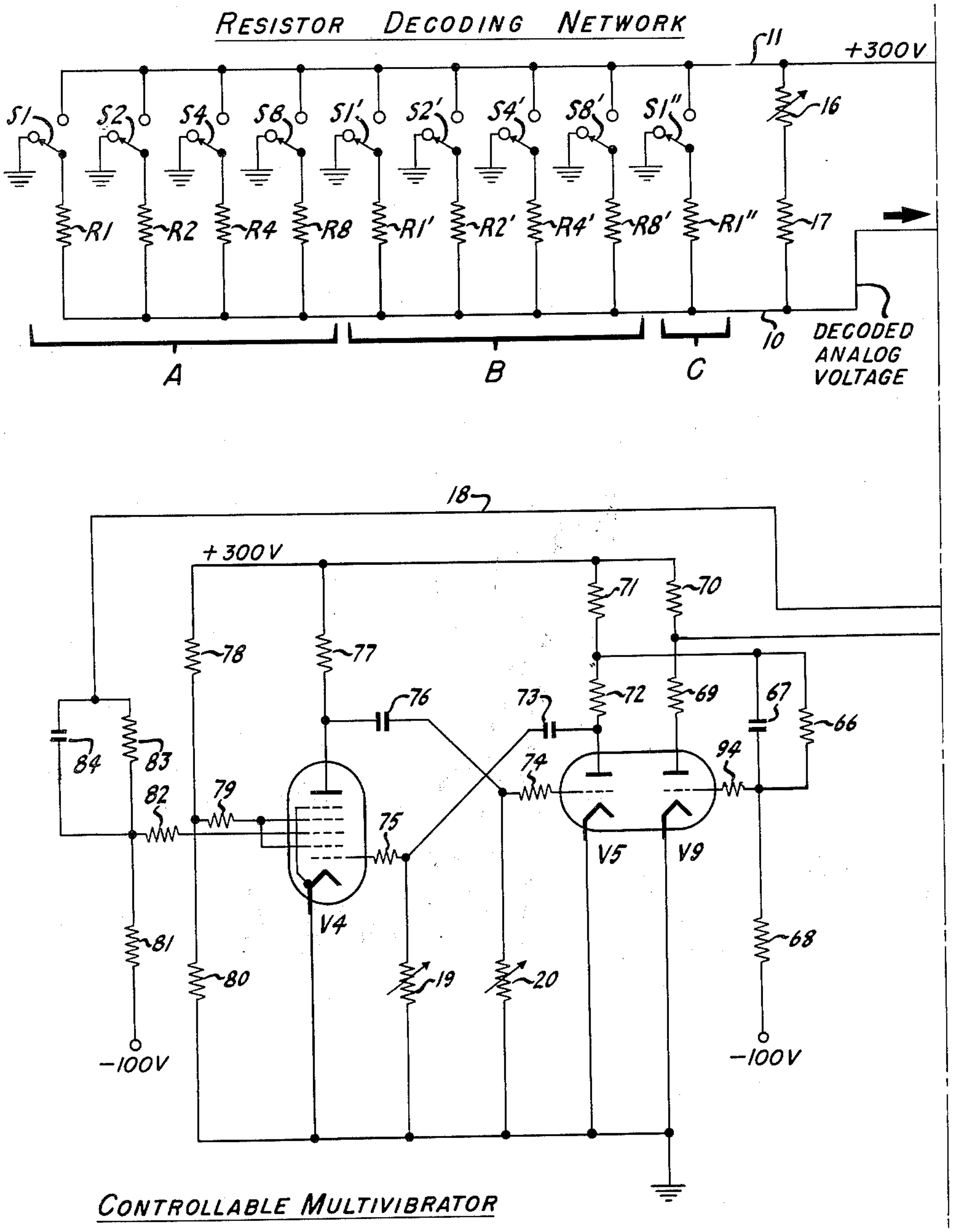
Figure 1B:
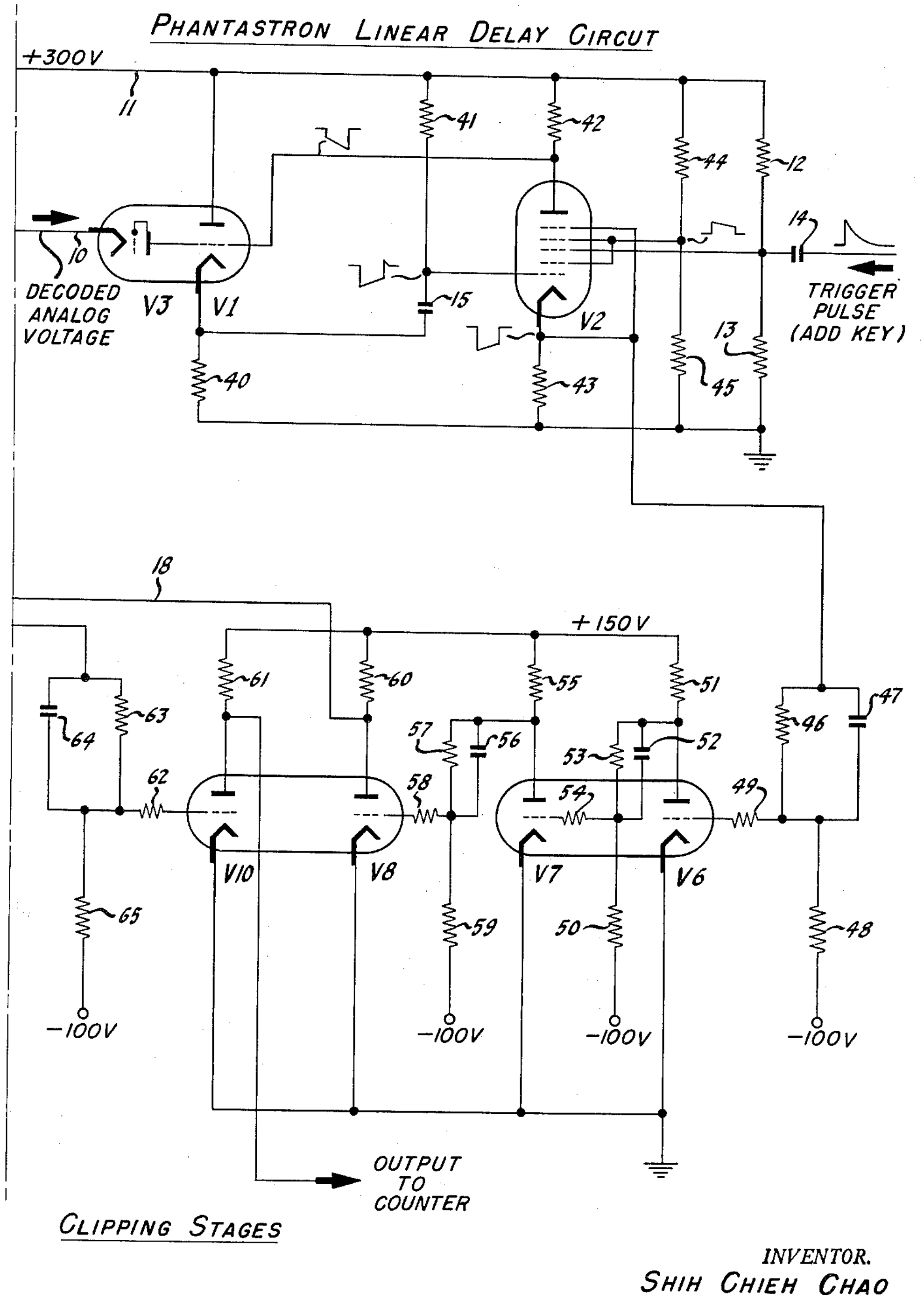

These and other objects and advantages will become apparent from the following detailed description taken in connection with the accompanying drawings in which:

FIGS. 1*a* and 1*b* disclose the circuit diagram of a component of the invention and should be placed adjacent each other.

Figure 2A:
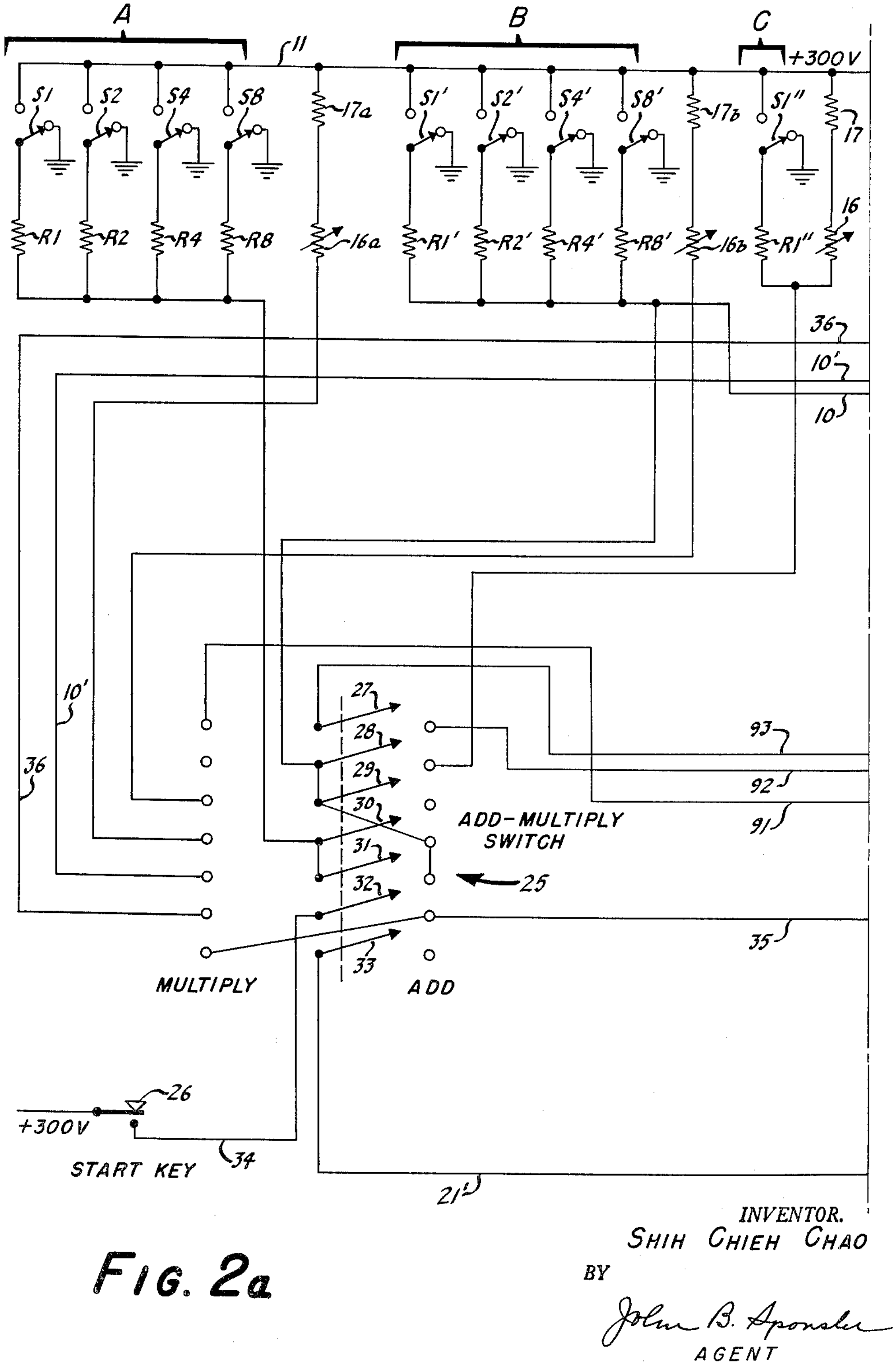
Figure 2B:
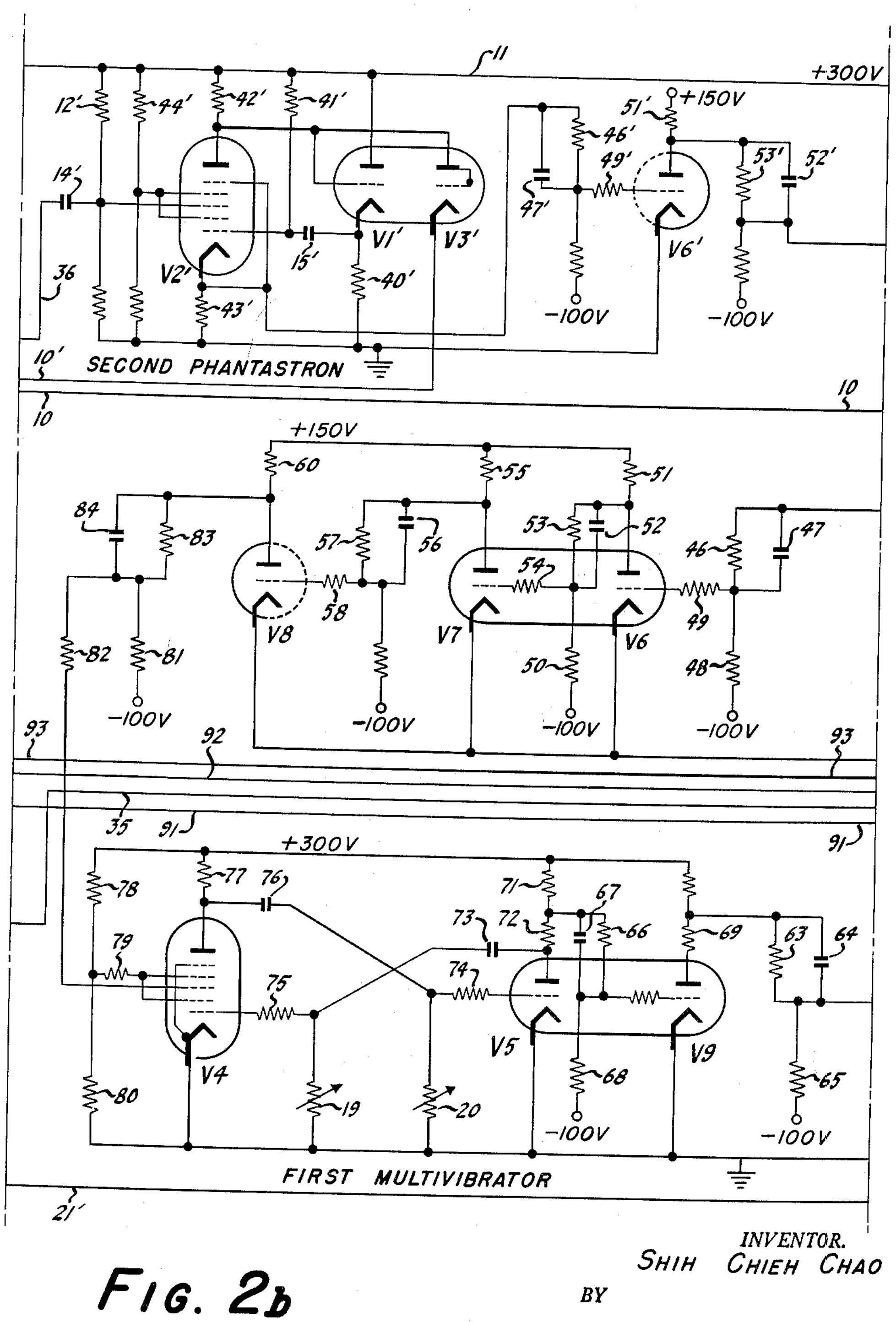
Figure 2C:
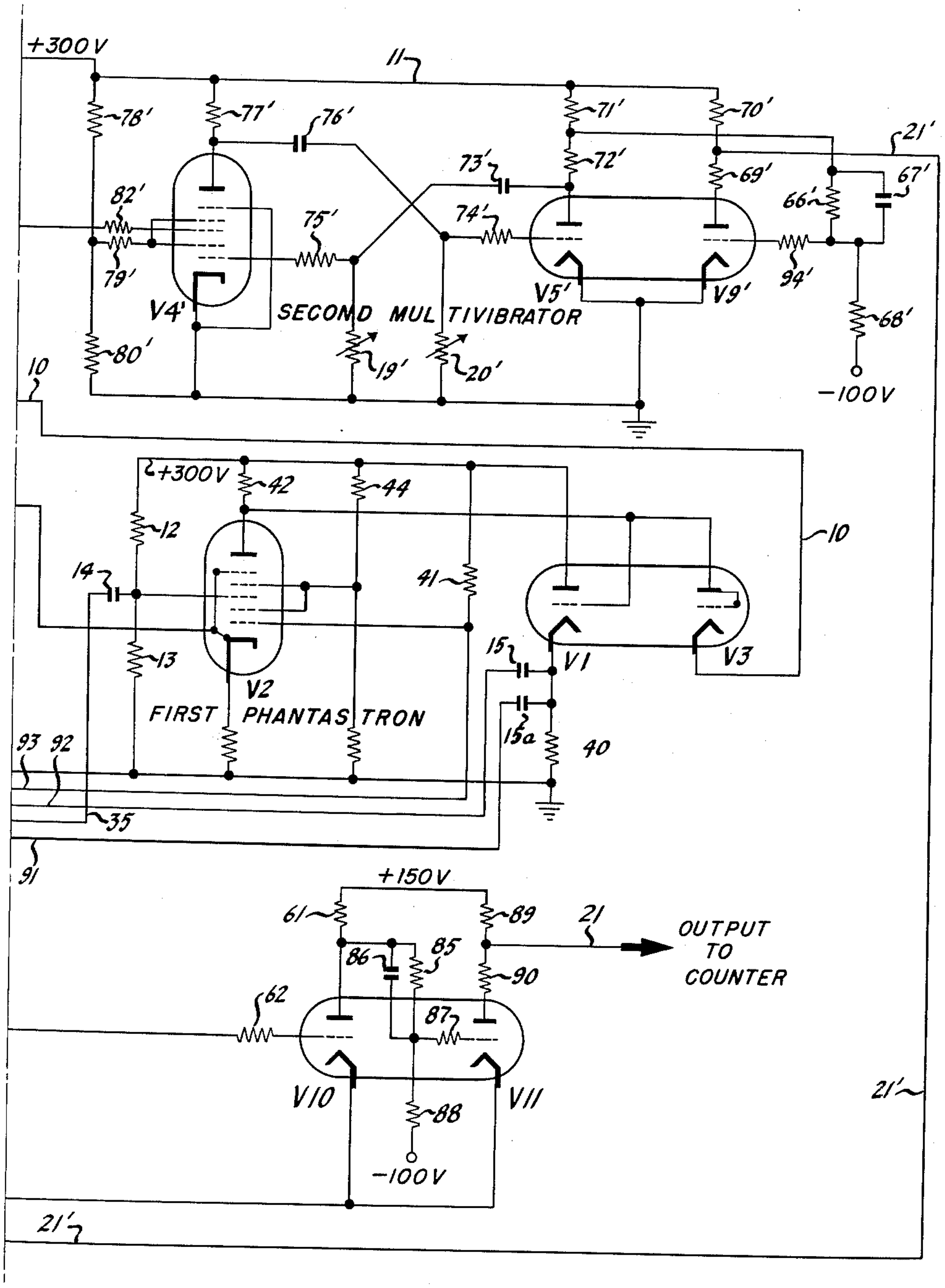

FIGS. 2*a*, 2*b* and 2*c* comprise a complete circuit diagram of the adder-multiplier of the invention and should be placed in line from left to right.

To facilitate an understanding of the invention, the basic component thereof, an adding device, will first be described. The adder (FIGS. 1*a* and 1*b*) includes a network of decoding resistors R (FIG. 1*a*) and associated switches S which are adapted to convert digits into an analog voltage, the amplitude of which is directly proportional to the sum of the digits entered.

The switches S and resistors R are divided into three input groups, A, B and C, to permit entry in the adder of three digits. The four switches S1, S2, S4 and S8 in each of the groups A and B have binary coded values of 1, 2, 4 and 8, respectively, and the single switch S1 in group C has a unit value, due to the relative values of the various resistors with which these switches are associated. Two digits to be added may be entered in groups A and B, and group C is suitable, for example, for entering a carry pulse from a lower order register when a multiple order adder is considered.

The switches S of each group A and B may be actuated individually or in combination, in the conventional manner, to alter the resistance between a line 10 and a 300-volt line 11 and between the line 10 and ground, to thereby provide a voltage on line 10 which is the analog of one of the decimal digits one through nine. Similarly, if digits are entered on more than one of the groups A, B or C, a voltage will be present on line 10 which is the analog of the sum of the digits so entered. (Circuit parameters for the embodiment of the invention disclosed herein may be found later in the text.) It is obvious that the switches S may be either manually operated, as are those shown in the drawings, or electronically controlled to permit input values to be entered automatically and at high rates of speed.

The analog potential of line 10 controls a phantastron linear delay circuit (FIG. 1*b*) comprising vacuum tubes V1 and V2, and is applied to the grid of V1 and to the plate of V2 through a diode V3. The purpose of the diode V3 is to limit the plate potential of V2 to within a few volts of the potential of line 10. When operated within its limits of linearity, the phantastron will provide an output pulse, the duration of which is a linear function of the amplitude of the plate potential of V2. Since the phantastron is well known, it is deemed that a brief review of its operation will suffice for the purpose of this description.

The plate potential of V2 cannot exceed the analog potential of line 10, though it is free to drop below it due to the infinite back impedance of the diode V3. In its normal state, therefore, the plate potential of V2 is approximately equal to the analog potential of line 10. Due to the bias on the #3 grid, the plate current is at a minimum, the #2 and #4 grids, i.e., screen grids, drawing most of the cathode current.

When a positive trigger pulse is applied to the #3 grid of V2 through a condenser 14, by means such as an add key (not shown), the cathode current is momentarily switched from the screen grids to the plate. The rise in plate current causes a corresponding decrease in plate potential. Since the plate of V2 is connected directly to the control grid of V1, a cathode follower, the drop in plate potential of V2 causes a corresponding drop on the cathode of V1 and on the control grid of V2, since the control grid of V2 is coupled through a condenser 15 to the cathode of V1. The negative pulse on the control grid of V2 decreases the cathode current and abruptly lowers the cathode potential. The drop in cathode potential effectively decreases the bias on the #3 grid, thereby increasing the percentage of cathode current flowing to the plate of V2.

The plate current will continue to rise and the plate potential to drop until further decrease of control grid potential will reduce the plate current due to the large reduction of total cathode current. At this moment, the switching action reverses. The increase in plate potential of V2 impresses a positive pulse on the control grid thereof, through the cathode follower V1, and causes the cathode potential to rapidly return to normal, thus increasing the effect of the bias on the #3 grid, and thereby completing the switching of the cathode current from the plate to the screen grids.

It is a characteristic of the phantastron that the plate potential of V2 drops linearly with time. Also, the cathode potential will drop abruptly as soon as the plate commences to drop and will remain at a low potential until the plate potential starts to recover, at which time the cathode potential will rise sharply, as noted by the appropriate waveforms shown in the drawings. It follows that the duration of a pulse taken from the cathode of V2 is controlled directly by the initial amplitude of the plate voltage, i.e., the amplitude of the analog potential of line 10.

In order to remain within the linear portion of the curve, it is necessary that the normal plate potential of V2, and thus the zero analog potential of line 10, have a minimum value above zero volts. It is for this purpose that the voltage divider comprising resistors 16 and 17 (FIG. 1*a*) is provided. The resistor 16 is made variable to permit proper adjustment of voltage divider, for a purpose to become clear hereinafter.

In the present embodiment, the timed pulses, hereinafter referred to as "gating" pulses, are taken from the cathode of V2 (FIG. 1*b*) and are used to gate a normally inoperative, astable multivibrator comprising tubes V4 and V5 (FIG. 1*a*). Prior to gating the multivibrator, however, the gating pulses are fed through three conventional clipping stages, V6, V7 and V8 (FIG. 1*b*), to improve the waveform thereof. The gating pulse, a well-shaped, rectangular, positive waveform, is then taken from the plate of the last clipping stage V8 and is fed, through a line 18, to the #3 grid of V4 (FIG. 1*a*). The multivibrator is normally inoperative due to the cutoff bias present on the #3 grid of V4. However, when the positive gating pulse is impressed on the #3 grid, V4 will conduct and the multivibrator will oscillate for the duration of the pulse, at which time V4 will again cut off. Two variable resistors 19 and 20 in the control grid circuits of V4 and V5, respectively, are provided to permit the frequency of the multivibrator to be adjusted for a purpose to become clear hereinafter.

Pulses generated by the multivibrator and taken from the plate of V5 are fed through two additional clipping stages V9 and V10, again to improve the waveform thereof, and the pulses taken from the plate of the final clipping stage V10 (FIG. 1*b*) may be entered in any suitable counting mechanism (not shown) through a conductor 21.

Prior to entering the digits in the adder, two simple, noncritical circuit adjustments must be made. First, with all the input switches S (FIG. 1*a*) in their open position, i.e., when they connect their associated resistors to ground, the variable resistor 16 is adjusted until the counter (not shown) registers an occasional 1 upon operation of the add key, then the resistance is increased slightly until no count is registered. This procedure adjusts the threshold or zero value of the decoded analog voltage. In the present embodiment, this value is approximately plus 47 volts. Sceondly, each input group A and B should be set to enter a digit 9, i.e., the switches S1 and S8 of groups A and B should be closed, and the switch S1 of input C should be closed. The two 9's entered in A and B plus the unit entry in C place a voltage equivalent of 19 on line 10. The multivibrator frequency is then adjusted by means of the variable resistors 19 and 20 until a 19 is registered in the counter upon operation of the add key. Because of the linearity of the phantastron circuit, all intermediate sums will now register accurately.

It should be noted that circuit adjustment is non-critical and reliability is exceptionally good when utilizing circuit parameters equivalent to those cited herein, because the analog voltage increases approximately 8 volts for each successive digit value. Additionally, the phantastron circuit itself is linear to within ±0.1% within that portion of the curve utilized herein.

In operation, two digits to be added are entered into the device by throwing the proper switches S, as above described, to thereby provide a voltage on line 10 which is the analog of their sum. Assume, for example, that the digits 7 and 8 are to be added. The 7 is entered in input A, by closing the switches S1, S2 and S4 thereof, and the 8 is entered in input B, by closing the switch S8 thereof. The voltage of line 10 will be raised from approximately 47 volts, the zero analog potential, to a potential of roughly 47 v.+8 v. (7+8)=167 v., the approximate analog potential of the number 15. When the phantastron is triggered, by actuation of the add key (not shown), a positive gating pulse taken from the cathode of V2 is applied to the grid of V4 which renders the multivibrator operative to provide 15 pulses to the counter (not shown). Thus, it should be clear that, by actuation of the right combination of switches, any two digits may be totaled and their sum read from the counter register.

Referring to FIGS. 2*a*, 2*b* and 2*c*, it will be seen that the adder-multiplier of the invention comprises two adders, each of which is substantially identical to the one described above. The component parts of each of the adders, hereinafter referred to as the "first" and "second" adders, are identified by reference characters which are similar to those used above; however, the reference characters which identify parts of the second adder are primed.

When the device is to be used as an adder, a switch 25 (FIG. 2*a*), the add-multiply switch, is thrown to the right, to the "add" position. With the switch 25 in this position, only one adder, the first one, is utilized, and the resulting circuit is substantially the same as the one previously described. Digits entered in the input groups A and B are decoded into an analog voltage on line 10, as before, and this voltage is applied to the plate of the first phantastron V2 (FIG. 2*c*) through the diode V3. A "start" key 26 (FIG. 2*a*) is provided to trigger the first phantastron V2 through a line 34, an armature 32 of the switch 25, and a line 35, to thereby create a timed pulse which gates the multivibrator V4, V5 (FIG. 2*b*). The pulses emitted by the multivibrator V4, V5 are fed through the clipping stages V9, V10 and V11 (FIGS. 2*b* and 2*c*) to any suitable counter (not shown).

To multiply, the switch 25 (FIG. 2*a*) is thrown to the "multiply" position to thereby isolate input group A from group B, remove group C from the circuit, remove the voltage divider comprising resistors 16 and 17 from the circuit, provide each group A and B with a substitute voltage divider comprising resistors 16*a*, 17*a* and 16*b*, 17*b*, respectively, and to connect input group A through armatures 30 and 31 through the line 10′ to the plate of the phantastron V2′ (FIG. 2*b*) of the second adder. Additionally, the output of the multivibrator V4′, V5′ (FIG. 2*c*) of the second adder is connected to the #3 grid of the phantastron V2 of the first adder, through the clipping stage V9′ of the second adder, the output line 21′ of the second adder, the armature 33 of the switch 25 and the line 35.

The second adder is provided to trigger the phantastron of the first adder, as will become clear from the following description of operation. When it is desired to multiply one digit by another, such as 6 by 9, for example, the 6 may be entered in group A (FIG. 2*a*) and is decoded thereby into an analog voltage which, through line 10′ and diode V3′ (FIG. 2*b*), is applied to the plate of the phantastron V2′ of the second adder. The 9 is entered in group B (FIG. 2*a*) and the voltage equivalent thereof is fed to the plate of the phantastron V2 (FIG. 2*c*) of the first adder through line 10 and the diode V3.

When the start key 26 (FIG. 2*a*) is operated, a trigger pulse is fed to the #3 grid of the second phantastron V2′ (FIG. 2*b*) through the line 34 (FIG. 2*a*), the armature 32 of switch 25 and a line 36, thus permitting the second phantastron V2′ (FIG. 2*b*) to create a timed gating pulse which renders the second multivibrator V4′, V5′ (FIG. 2*c*) operative to emit 6 pulses. As mentioned earlier, the output of the second multivibrator is coupled to the #3 grid of the first phantastron V2. The pulses emitted by the second multivibrator are utilized to trigger the first phantastron, and in the present example the first phantastron will be triggered 6 times thereby.

Each time the first phantastron V2 (FIG. 2*c*) is triggered, the resultant gating pulse renders the first multivibrator V4, V5 (FIG. 2*b*) operative to emit 9 pulses through the clipping stages V9, V10 and V11 (FIGS. 2*b* and 2*c*) to the counter, and, since the first phantastron V2 is triggered 6 times, a total of 54 pulses will be registered in the counter.

It should be noted that, since the second multivibrator V4′, V5′ is used to trigger the first phantastron V2, the pulse frequency thereof must be sufficiently low to permit the first phantastron to create a maximum length gate, i.e., a "9" gate, and to fully recover therefrom, between successive pulses. As is readily apparent, this may be taken care of by the proper adjustment of the resistors 19′ and 20′ in the second multivibrator circuit which permit adjustment of the multivibrator frequency.

When the switch 25 is in the add position, the condenser 15 (FIG. 2*c*) is utilized to couple the cathode of the cathode follower V1 to the control grid of the first phantastron V2. However, when the switch 25 is in the multiply position, the condenser 15 is replaced by a condenser 15*a*. It will be recalled that when input groups A, B and C are connected in parallel, as they are when the switch 25 is in the add position, the analog potential on line 10 varies in steps of 8 volts for successive digit values. This is obviously not true when the switch 25 is in the multiply position, since groups A and B are isolated from each other and group C is entirely omitted from the circuit. In this case, the analog potential of lines 10 and 10′ varies in steps of roughly 17 volts for successive digit values, and thereby provides additional reliability by using much of the linear range of the phantastron. If the circuit of the first phantastron were to have the same time constant, i.e., the same condenser 15 in each case, the resultant gating pulses produced thereby would be different duration for the same digital input, due to the different analog voltages. Thus, by replacing the condenser 15 with the condenser 15*a*, when it is desired to multiply, the time constant of the first phantastron circuit is changed to compensate for the increased step voltages. In this way, entry of a digit into group B will create a gating pulse of the same duration, for a given digital input, whether the switch 25 is in the add or multiply position.

By way of example, the following parameters, including values and types of resistors, capacitors, and tubes, are given. It should be noted that other values may be used, and it is quite possible that improvement in operation could be secured through deviation from the values and types given.

Resistors in kilo-ohms:

| | |
|---|---|
| R1, R1′, R1″ | 400 |
| R2, R2′ | 200 |
| R4, R4′ | 100 |
| R8, R8′ | 50 |
| 12, 12′ | 200 |
| 13, 13′ | 27 |
| 16 | 0–5 |
| 16*a*, 16*b* | 0–10 |
| 17 | 68 |
| 17*a*, 17*b* | 160 |
| 19, 19′ | 0–1000 |
| 20, 20′ | 0–1000 |
| 40, 40′ | 25 |
| 41, 42, 41′, 42′ | 1000 |
| 43, 43′ | 10 |
| 44, 44′ | 22 |
| 45, 45′ | 11 |
| 46, 46′ | 150 |
| 48, 48′ | 470 |
| 49, 49′ | 47 |
| 50, 50′ | 470 |
| 51, 51′ | 20 |
| 53, 53′ | 390 |
| 54, 54′ | 47 |
| 55, 55′ | 20 |
| 57, 57′ | 390 |
| 58, 58′ | 47 |
| 59, 59′ | 470 |
| 60, 60′ | 20 |
| 61, 61′ | 20 |
| 62, 62′ | 47 |
| 63, 63′ | 470 |
| 65, 65′ | 200 |
| 66, 66′ | 470 |
| 68, 68′ | 200 |
| 69, 69′ | 6.8 |
| 70, 70′ | 15 |
| 71, 71′ | 15 |
| 72, 72′ | 6.8 |
| 74, 74′ | 47 |
| 75, 75′ | 47 |
| 77, 77′ | 22 |
| 78, 78′ | 22 |
| 79, 79′ | 470 |
| 80, 80′ | 12 |
| 81, 81′ | 470 |
| 82, 82′ | 68 |
| 83, 83′ | 390 |
| 85 | 390 |
| 87 | 47 |
| 88 | 470 |
| 89 | 10 |
| 90 | 10 |
| 94, 94′ | 47 |

Condensers in microfarads:

| | |
|---|---|
| 14, 14′ | 50 |
| 15, 15′ | 700 |
| 15*a* | 260 |

| | |
|---|---|
| 47, 47′ | 100 |
| 52, 52′ | 100 |
| 56, 56′ | 100 |
| 64, 64′ | 91 |
| 67, 67′ | 91 |
| 73, 73′ | 20 |
| 76, 76′ | 20 |
| 84, 84′ | 100 |
| 86 | 91 |

Tubes:

| | |
|---|---|
| V1, V1′ | ½-12AU7 |
| V2, V2′ | 6BE6 |
| V3, V3′ | ½-12AU7 |
| V4, V4′ | 6BE6 |
| V5, V5′ | ½-12AU7 |
| V6, V6′ | ½-6J6 |
| V7 | ½-6J6 |
| V8 | ½-6J6 |
| V9, V9′ | ½-12AU7 |
| V10 | ½-6J6 |
| V11 | ½-6J6 |

While there have been shown, described and pointed out the fundamental novel features of the invention as applied to the disclosed embodiment, it will be understood that various omissions, substitutions and changes in the form and details of the device illustrated and in its operation may be made by those skilled in the art without departing from the scope and spirit of the invention. For instance, it is obvious that the teaching of the present invention may be utilized to provide a multiple order adder and/or multiplier in any one of several well known ways, such as those disclosed in chapter 21 of the book entitled "The Design of Switching Circuits" by Kester, Ritchie and Washburn. It is the intention, therefore, to be limited only as indicated by the following claims.

What I claim is:

1. A device for creating a number of pulses equal to the product of X and Y comprising a first pulse creating means and means for triggering said first pulse creating means, said first pulse creating means being adapted to emit X pulses when triggered, said trigger means comprising means for converting Y into an analog potential, and means operable in response to the amplitude of said potential for creating Y pulses, each of which is adapted to trigger said first pulse creating means.

2. A device for producing a number of pulses equal to the product of X and Y comprising means for converting X into a first potential, a normally inoperative first pulse generator, means controlled by the amplitude of said first potential for causing said first pulse generator to emit X pulses when operative, means for converting Y into a second potential, a normally inoperative second pulse generator, means controlled by the amplitude of said second potential for causing said second pulse generator to emit Y pulses when operative, and means for rendering said first pulse generator operative, said first and second pulse egnerators being so arranged that each pulse emitted by said first pulse generator will render said second pulse generator operative.

3. In combination, means for converting a number X into a first potential, the amplitude of which is the analog of X, means for converting a second number Y into a second potential, the amplitude of which is the analog of Y, a first normally inoperative pulse generating means adapted when operative to generate pulses, the number of which is controlled by the amplitude of said first potential, a second normally inoperative pulse generating means adapted when operative to generate pulses, the number of which is controlled by the amplitude of said second potential, the pulses emitted by said second pulse generating means being effective to render said first pulse generating means operative, and means for rendering said second pulse generating means operative.

4. In combination, means for converting a number X into a first potential, means for converting a second number Y into a second potential, a first pulse generator adapted to generate pulses when gated, a first gating means adapted when triggered to gate said first generator for a period of time controlled by said first potential, a second pulse generator adapted to generate pulses when gated, a second gating means adapted when triggered to gate said second generator for a period of time controlled by said second potential, means for triggering said first gating means, and means utilizing pulses generated by said first generator for triggering said second gating means, whereby the total of the pulses generated by said second generator is representative of the product of X and Y.

5. A device for providing a number of electrical impulses equal to the product of two numbers comprising means for converting a first number into a potential, the amplitude of which is the analog of said first number, a normally inoperative pulse producing means which when operative is adapted to emit pulses at a predetermined frequency, a normally inoperative gating means which when triggered is adapted to render said pulse producing means operative for a period of time which is the analog of the amplitude of said potential to thereby render said pulse producing means effective to emit pulses equal in number to said first number, and means for successively triggering said gating means a number of times equal to a second number.

6. A device for producing a number of pulses representative of the product of X and Y comprising means for decoding X into a first potential, the amplitude of which is the analog of X, a normally inoperative first pulse generator, said pulse generator being adapted when operative to generate pulses at a predetermined frequency, means operable in response to a trigger signal for creating a voltage which is effective to render said first generator operative, the effective duration of said voltage being controlled by the amplitude of said first potential, means for decoding Y into a second potential, the amplitude of which is the analog of Y, a normally inoperative second pulse generator, said pulse genreator being adapted when operative to generate pulses at a predetermined frequency, means operable in response to a pulse emitted by said first pulse generator for creating a voltage which is effective to render said second pulse generator operative, the effective duration of said voltage being controlled by the amplitude of said second potential, and means for triggering said first mentioned voltage creating means.

7. A device for providing a number of electrical impulses equal to the product of X and Y comprising means for converting X into a first potential, the amplitude of which is the analog of X, means for converting Y into a second potential, the amplitude of which is the analog of Y, a first multivibrator adapted to emit electrical impulses at a predetermined frequency while gated, normally inoperative first gating means which when triggered is adapted to gate said first multivibrator, the duration of said gate being controlled by the amplitude of said first potential to render said first multivibrator effective to emit X electrical impulses, a second multivibrator adapted to emit electrical impulses at a predetermined frequency while gated, the frequency of said second multivibrator being higher than said first multivibrator, normally inoperative second gating means which when triggered is adapted to gate said second multivibrator, the duration of said gate being controlled by the amplitude of said second potential to render said second multivibrator effective to emit Y electrical impulses, means for triggering said first gating means, and means utilizing each electrical impulse emitted by said first multivibrator for triggering said second gating means.

8. A device comprising a first decoding means for converting a first number into a first potential, the amplitude of which is the analog of said first number, a second decoding means for converting a second number into a second potential, the amplitude of which is the analog of said second number, a normally inoperative first multivibrator which when operative is adapted to emit electrical impulses at a predetermined frequency, a normally ineffective first gating means which when triggered is adapted to render said first multivibrator operative for a period of time controlled by the amplitude of said first potential to thereby render said first multivibrator effective to emit a number of electrical impulses equal to said first number, a normally inoperative second multivibrator which when operative is adapted to emit electrical impulses at a predetermined frequency, the frequency of said second multivibrator being higher than said first multivibrator, normally ineffective second gating means which when triggered is adapted to render said second multivibrator operative for a period of time controlled by the amplitude of said second potential to thereby render said second multivibrator effective to emit a number of electrical impulses equal to said second number, and means for triggering said first gating means, said first multivibrator and said second gating means being so constructed and arranged that said second gating means is triggered by each pulse emitted by said first multivibrator, whereby the total of the electrical impulses emitted by said second multivibrator is equal to the product of said first and second numbers.

9. A multiplier comprising a first resistor decoding network for converting a first number into a first potential, the amplitude of which is the analog of said first number, a second resistor decoding network for converting a second number into a second potential, the amplitude of which is the analog of said second number, a first multivibrator which is normally inoperative due to a negative voltage applied thereto, said multivibrator being adapted when operative to emit electrical impulses at a predetermined frequency, a normally inoperative first gating means which when operative is adapted to create a timed gating pulse for rendering the negative voltage applied to said first multivibrator ineffective for a period of time controlled by the amplitude of said first potential to thereby render said multivibrator effective to emit electrical impulses equal in number to said first number, a second multivibrator which is normally inoperative due to a negative voltage applied thereto, said multivibrator being adapted when operative to emit electrical impulses at a predetermined frequency, the frequency of said second multivibrator being higher than said first multivibrator, normally inoperative second gating means which when operative is adapted to create a timed gating pulse for rendering the negative voltage applied to said second multivibrator ineffective for a period of time controlled by the amplitude of said second potential to thereby render said multivibrator effective to emit electrical impulses equal in number to said second number, means for triggering said first gating means to thereby render it operative, and means utilizing each electrical impulse emitted by said first multivibrator for triggering said second gating means, whereby the total of the electrical impulses emitted by said second multivibrator is equal to the product of said first and second numbers.

10. An adder comprising a vacuum tube circuit arranged to develop a pulse having a duration controlled by the initial potential of the plate thereof, said initial potential being determined by the potential of one side of each of a plurality of decoding resistors, said resistors being arranged in a plurality of binary coded groups, a power supply for energizing said vacuum tube circuit, and means for selectively connecting the other side of said decoding resistors to said power supply according to the magnitude of numbers to be added for determining the initial potential of said plate according to the sum of the numbers to be added, whereby a pulse having a duration which is the analog of the sum of the numbers being added is developed by said circuit.

11. The invention set forth in claim 10 with the further provision of a pulse generator under the control of said analog pulse developed by said circuit for controlling the number of pulses emitted by said generator whereby the number of emitted pulses is determined by the sum of the numbers being added.

12. An adder comprising a normally inoperative vacuum tube circuit arranged when operative to develop a gate pulse having a duration determined by the initial potential of an element thereof, a power supply for energizing said circuit, a plurality of decoding resistors, one side of each of which is connected to a common point, said resistors being arranged in a plurality of binary coded groups, means for selectively connecting the other side of said resistors to said power supply according to the numbers being added, the initial potential of said element being determined by the potential of said common point in such a way that said initial potential is the analog of the sum of the numbers being added, means for rendering said circuit operative, and means under the control of gate pulses developed by said circuit for generating pulses for the duration of said gate pulses whereby a number of pulses corresponding to the sum of the numbers being added are generated.

13. A device for multiplying comprising means for entering pulses into an output circuit, means responsive to a multiplicand for controlling the number of pulses entered into said output circuit, said control means being arranged to operate independently of said pulse entering means and being adapted to limit the pulses entered into said output circuit to a number equal to the multiplicand each time it is operated, and multivibrator means responsive to a multiplier for operating said control means a number of times equal to said multiplier.

14. A multiplier comprising a pulse generating means arranged to emit pulses into an output circuit when gated, means operating independently of said generating means and under the control of a multiplicand for creating a gate for gating said generating means, said gate creating means and said pulse generating means being arranged to cooperate in such a manner that the number of pulses emitted into said output circuit when said generating means is gated is equal to the multiplicand, and multivibrator means under the control of a multiplier for operating said gate creating means a number of times equal to the multiplier whereby a pulse stream equal in number to the product of the multiplier and the multiplicand is entered into said output circuit.

15. A device for selectively performing the functions of addition and multiplication, said device comprising a means for converting a number X into a first potential, a means for converting a number Y into a second potential, a first means for generating a number of pulses corresponding to an impressed potential, a second means for generating a number of pulses corresponding to an impressed potential, and a switching means coupled to all of the aforesaid means, said switching means being selectively operable to combine the first potential and the second potential and to impress the combined potential upon the first pulse generating means, said switching means being further slectively operable to impress the first potential upon the first pulse generating means and to impress the second potential upon the second pulse generating means, said first pulse generating means being coupled to be triggered by the pulses generated by the second pulse generating means.

16. A device for selectively performing the functions of addition and multiplication, said device comprising a means for converting a number X into a first potential, a means for converting a number Y into a second potential, a first means for generating a number of pulses corresponding to an impressed potential, a second means for generating a number of pulses corresponding to an impressed potential, and a switching means coupled to all of the aforesaid means, said switching means being selectively operable to combine the first potential and the second potential and to impress the combined potential upon the first pulse generating means whereby said first pulse generating means will generate a number of output pulses corresponding to the sum of X and Y, said switching means being further selectively operable to impress the first potential upon the first pulse generating means and to impress said second potential upon the second pulse generating means, said first pulse generating means being repetitively triggered by pulses from the second pulse generating means whereby the first pulse generating means generates a number of output pulses corresponding to the product of X and Y.

17. A device for selectively performing the functions of addition and multiplication, said device comprising a means for converting a number X into a first potential, a means for converting a number Y into a second potential, a switching means coupled to both of the aforesaid means, a first pulse generator for generating pulses when gated, a first gating means coupled to gate said first pulse generator, a second pulse generator for generating pulses when gated, a second gating means coupled to gate the second pulse generator, said switching means being selectively operable to combine both the first and the second potentials and to pass the combined potential to the first gating means, said first gating means being operable to gate the pulse generator for a time duration corresponding to the combined potential whereby the first pulse generator will generate a number of pulses corresponding to the sum of X and Y, said switching means being further selectively operable to pass the first potential to the first gating means and to pass the second potential to the second gating means, said first gating means and said first pulse generator being operable when triggered to generate a number of pulses corresponding to the number X, and said second gating means and said second pulse generator being operable to repetitively trigger the first gating means a number of times corresponding to the number Y.

References Cited in the file of this patent

UNITED STATES PATENTS

| | | |
|---|---|---|
| 2,176,932 | Smith | Oct. 24, 1939 |
| 2,272,070 | Reeves | Feb. 3, 1942 |
| 2,442,428 | Mumma | June 1, 1948 |
| 2,616,965 | Hoeppner | Nov. 4, 1952 |
| 2,641,407 | Dickinson | June 9, 1953 |
| 2,700,501 | Wang | Jan. 25, 1955 |
| 2,738,504 | Gray | Mar. 13, 1956 |
| 2,784,907 | Williams et al. | Mar. 12, 1957 |

OTHER REFERENCES

An Analog-to-Digital Converter With an Improved Linear-Sweep Generator (Slaughter), Convention Record of the March 23–26, 1953, I.R.E. National Convention, pages 7–12.

Korn and Korn: Electronic Analog Computers, McGraw-Hill Book Co., 1952, Fig. 1.8, page 14. (Copy in Div. 23.)